United States Patent

[11] 3,580,657

| | | |
|---|---|---|
| [72] | Inventor | Nicholas K. Sheridon<br>Fairport, N.Y. |
| [21] | Appl. No. | 728,986 |
| [22] | Filed | May 14, 1968 |
| [45] | Patented | May 25, 1971 |
| [73] | Assignee | Xerox Corporation<br>Rochester, N.Y. |

[54] BLAZED SURFACE HOLOGRAM
27 Claims, 9 Drawing Figs.

[52] U.S. Cl. .................................................. 350/3.5,
350/162
[51] Int. Cl. .................................................. G02b 27/22,
G02b 5/18
[50] Field of Search .......................................... 350/3.5;
96/84, 115, 162

[56] References Cited
UNITED STATES PATENTS

| | | | | |
|---|---|---|---|---|
| 3,045,531 | 7/1962 | Prescott | | 350/162 |
| 1,965,710 | 7/1934 | Murray | | 96/115 |
| 2,791,504 | 5/1957 | Plambeck | | 96/84 |

OTHER REFERENCES
Hoffman, J. Opt. Soc. Am., 55 p. 1559 (11/1965)
Ramberg, RCA Review, 27 pp. 479-481 (1200/1966)

*Primary Examiner*—David Schonberg
*Assistant Examiner*—Robert L. Sherman
*Attorneys*—Paul M. Enlow, James J. Ralabate, Norman E. Schrader, Ronald Zibelli and David C. Petre ABSTRACT: A blazed hologram is produced by exposing a photohardenable material to a stationary standing wave pattern preferably followed by preferential dissolution of the relatively exposed (or relatively unexposed depending on the type of photohardenable material) portions of the exposed photohardenable material in a developer liquid to create, in a preferred embodiment, a blazed, step or sawtoothlike surface profile relief pattern produced by preferential etching, the extent of the etching following sections of the intensity surfaces because the areas of lower exposure are eroded where they come to the surface of the photoresist material and hence are subject to the developer liquid. The optical information presented in exposure is carried in the form of a surface relief on the developed photohardenable member. This surface relief may be used to reconstruct the optical image and may be used in other advantageous ways as described herein.

PATENTED MAY 25 1971 3,580,657
SHEET 1 OF 2
INVENTOR.
NICHOLAS K. SHERIDON
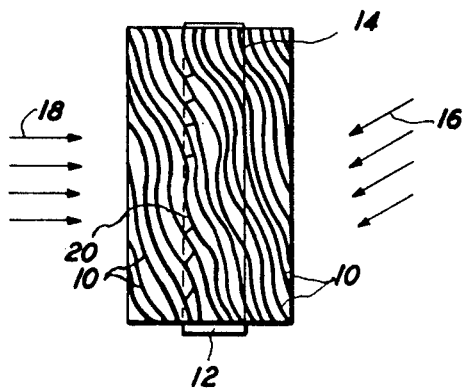
FIG. 1
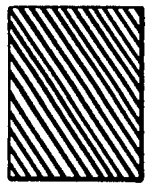
FIG. 2A
FIG. 2B
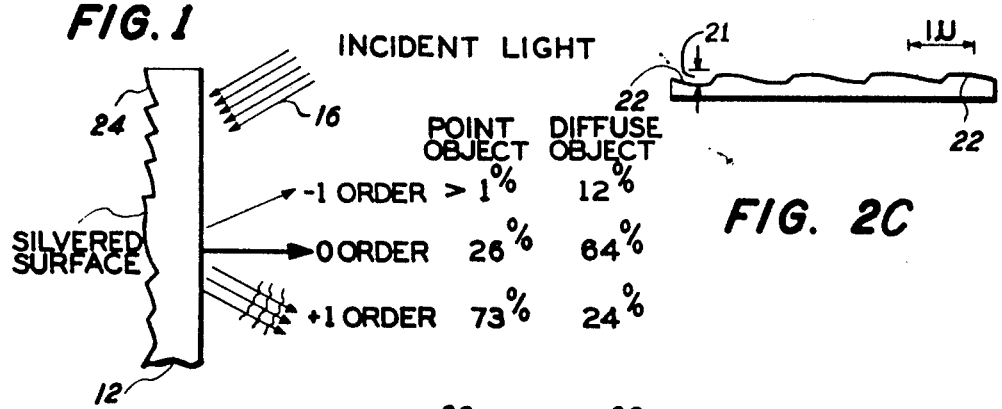
FIG. 2C
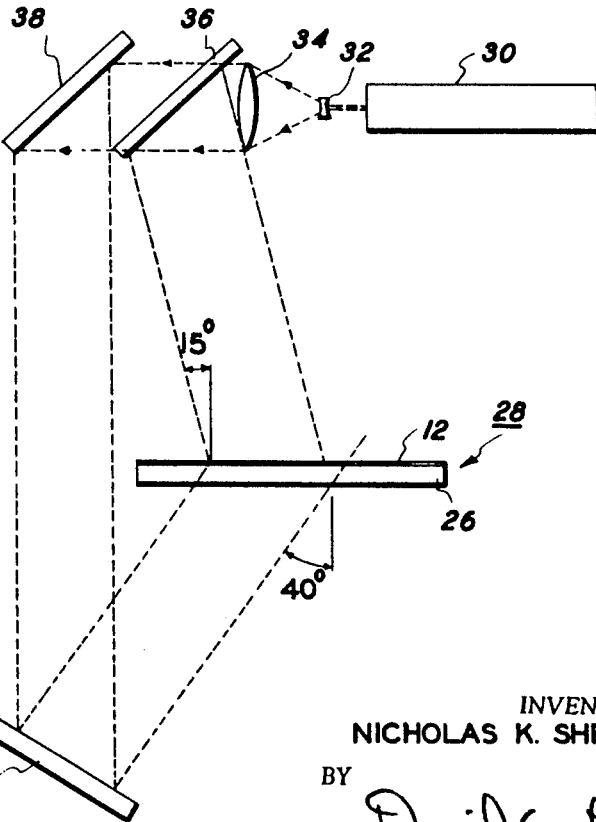
FIG. 3
FIG. 4

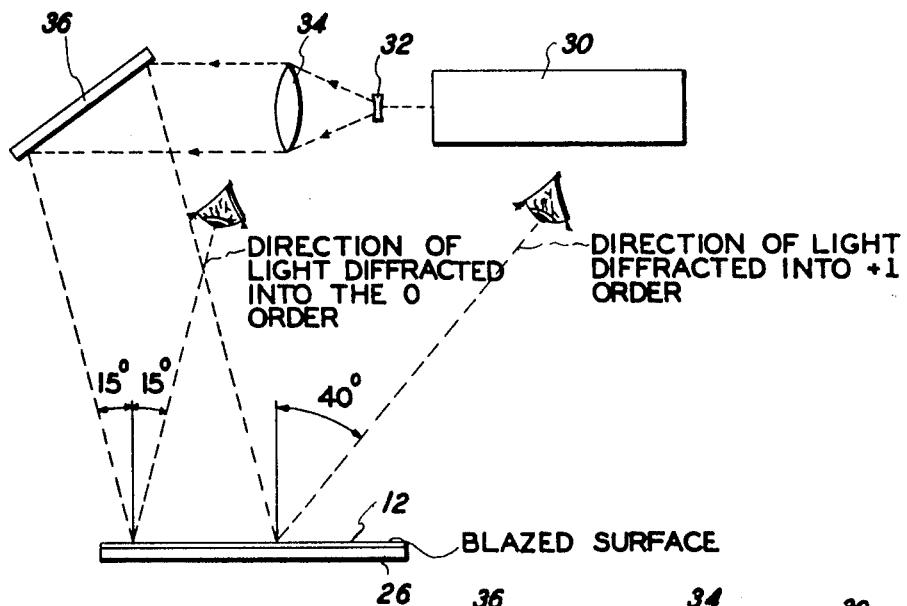
FIG. 5
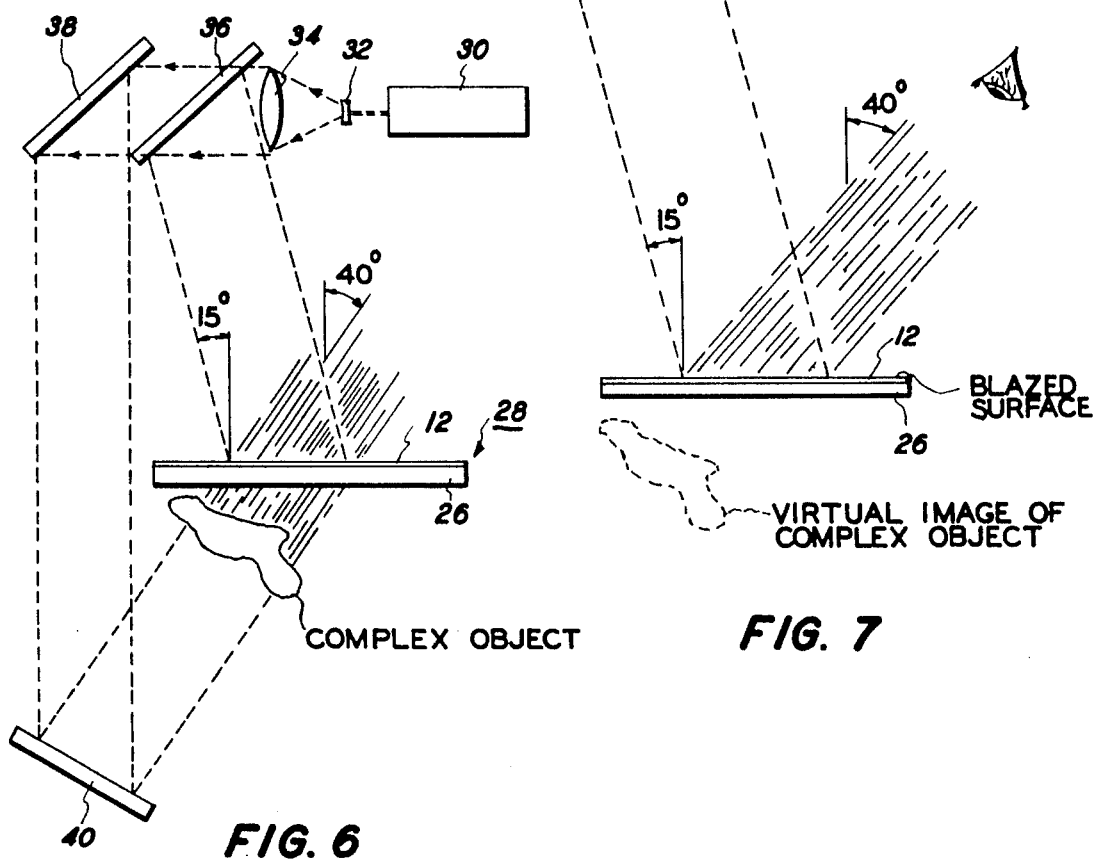
FIG. 6
FIG. 7

BLAZED SURFACE HOLOGRAM

BACKGROUND OF THE INVENTION

This invention relates to an imaging system and more specifically to a novel holographic imaging system.

Recently, an entirely new field of optical imaging technology has arisen identified by the phrase "holography."

Broadly, a hologram is a physical structure, typically produced from a photosensitive layer such as present on photographic film, that has been created, typically by special exposure techniques, to have the physical properties necessary to force an impinging wave front of electromagnetic radiation, from a suitable available source of radiation, to assume at least in part the form of another wave front, typically to yield a viewable image, in order to create the second wave front from the first. In other words, the hologram transforms an incoming wave front usually but not necessarily of simple form e.g. plane or spherical into an outgoing complicated wave front resembling the wave front used in making the hologram.

Presently, most holograms are made with laser radiation and photographic plates. The development of the laser has greatly contributed to the increasing intensity of interest in holography, since holography which works so well with laser radiation, works very poorly with more conventional light, since laser light is "coherent" which is generally defined as radiation that is an ordered succession of waves of typically one color or frequency. Coherent light is composed of waves in a wave front wherein the phase difference between individual waves at different positions remains constant with time. A notorious physical effect of coherent light is that it will produce a stationary interference pattern.

Typically, a hologram may be made by directing a portion of radiation from a laser or other source of coherent radiation at or through an object to be holographed and providing a separate portion of the radiation, called a reference beam by various mirror and/or lens arrangements (or otherwise providing for a separate beam that is in phase with the beam of light illuminating the object) and then positioning the imaging member, typically photographic film so that it receives both the object modulated radiation and the reference beam. The film will then record the intensity of the sum of the two fields, i.e. will record the stationary interference pattern between the two fields. The fields must be coherent or else the interference pattern is a rapidly varying function of time which will average to a uniform intensity across the hologram over any practical exposure time. Typically, the reference beam is a plane wave which is made to impinge upon the recording surface at least at a slight angle. As the plane wave combines and interacts with the object modulated radiation, an interference pattern occurs at the recording surface which is indicative of the modulation of the plane wave by the object modulated wave front.

Subsequently, the interference pattern developed upon the recording surface may be utilized in reconstruction of the object modulated wave front, typically to produce a viewable image of the object by suitably directing a beam similar to the reference beam at the hologram.

Certain variations of reference beam position and/or photosensitive material give rise to different kinds or classes of holograms. That is, the reference beam in construction may impinge upon the same side of the photosensitive layer as the object modulated beam, or it may impinge upon the opposite side of the photosensitive layer, each case giving rise to a stationary interference pattern having different properties. The photosensitive material may be of such a nature that the actual physical effect recorded at the photosensitive member itself may be intensity modulating or phase modulating for subsequent reconstruction illumination.

The type of hologram characterized by both reference beam and object modulated beam impinging upon the same side of the photosensitive member consists of recorded interference patterns which are nearly parallel surfaces which are typically nearly perpendicular to the surfaces of the photosensitive layer. Typically the thickness of the photosensitive layer is much less than the distances between adjacent interference pattern surfaces, so these interference pattern surfaces behave like lines on a two dimensional surface.

As practiced originally by Gabor (Proc. Roy. Soc. A, 197, 454–87, (1949)) and later by Leith and Upatnieks (J. Opt. Soc. Amer., Vol. 53 No. 12, 1377–81, (1963)), the photosensitive member typically modulates the amplitude of the illumination beams to reconstruct a wavefront from which an image of the holographed object may be formed. Others, such as Cathey, J. Opt. Soc. Amer., Vol. 55, No. 4, 457 (1965), George and Matthews, Holographic Diffraction Gratings, Applied Physics Letters 9, 212 (Sept. 1966), and Meier and Urbach, Appl. Optics, Vol. 5, No. 4, 666–7 (1966) have made phase modulating holograms by using photosensitive materials that could be made to undergo a change in refractive index and/or optical thickness that was directly related to the intensity of light in the stationary interference pattern during exposure.

That hologram produced by directing the object modulated beam and the reference beam through opposite sides of the photosensitive layer was first described by Denisyuk. This hologram consists of recorded interference patterns which are nearly parallel surfaces and which are approximately one-half wavelength of the light apart and which are typically nearly parallel to the surfaces of the photosensitive layer. The wave fronts from which an image of the holographed object can be formed are reconstructed by passing an illumination beam similar to the reference beam through the hologram. Each recorded interference surface will reflect and phase modulate a portion of the illumination beam light to form wave fronts which diverge from a virtual image or converge to a real image of the holographed object. The image produced from each surface will superimpose on those produced by other surfaces to form a brighter image.

Unlike other holograms which typically produce phase modulation by variations in the index of refraction or the optical density of the hologram medium, this Denisyuk hologram produces phase modulation by the shapes of the recorded interference surfaces from which the image forming light reflects.

Holography has a great many advantages over other imaging techniques. For example, a hologram may be used to reconstruct a three dimensional image or one resulting in high magnification. It may be used for the secure transmission of information, since the hologram itself bears little or no resemblance to the original object from which it was made.

The holograms described hereto suffer the common fault that they are low in the efficiency with which they utilize the illumination light to form an image. Of that class of holograms produced by passing both the reference beam and the object modulated beam into the light sensitive layer from the same side of that layer the intensity modulating holograms are the least efficient. Phase modulating holograms are somewhat more efficient, but for images of acceptable quality the efficiencies would be typically less than 20 percent.

The Denisyuk type of hologram is also low in light utilization efficiency. In this hologram the antinodal surfaces of the wave field are typically recorded as silver deposits in the emulsion volume, the silver deposits serving as a plurality of reflection surfaces for the reconstruction of the wave field from which an image can be formed. For example, these interference surfaces may typically be in the order of one-half wavelength apart and 30 or more may be recorded in an emulsion of typical thickness. When reconstruction illumination is shown upon the hologram, each of these developed interference surfaces absorbs some of the light and reflects a small portion of it to form an image. Consequently only a fraction of the illumination light is utilized to form an image.

Except for the phase modulating Gabor-Leith and Upatnieks type hologram these holographic systems have the further disadvantage that they cannot be conveniently or cheaply reproduced by nonholographic techniques. In this regard, copending application Ser. No. 666,617 filed Sept. 11, 1967, describes a simple mechanical pressing technique for replicating the Gabor-Leith and Upatnieeks type phase modulating hologram or any deformed single surface hologram.

Thus, there is a continuing need for a more advantageous holographic imaging system, especially one combining high efficiencies with an information-bearing surface that may be readily replicated.

OBJECTS OF THE INVENTION

It is, therefore, an object of this invention to provide a holographic imaging system which overcomes the above-noted deficiencies and satisfies the above-noted wants.

It is a further object of this invention to provide a holographic imaging system capable of producing a blazed holographic surface relief recording.

It is a further object of this invention to provide a holographic imaging system with extremely high reconstruction efficiency.

It is a still further object of this invention to provide a novel, simple mode of producing high quality blazed diffraction gratings.

It is a still further object of this invention to provide a holographic imaging system to produce holograms capable of ready replication.

It is a still further object of this invention to provide holograms which utilize a far larger fraction of reconstruction radiation to form a single image with a minimum of image distortion than prior art surface relief hologram concepts.

It is a further object of this invention to provide a holographic imaging system wherein a single relief surface conforming to portions of a plurality of standing wave surfaces converts substantially all of the reconstruction radiation into a reconstructed image.

BRIEF SUMMARY OF THE INVENTION

The foregoing objects and others are accomplished in accordance with this invention by providing a photohardenable imaging member, imaging a standing optical wave field in and on said photosensitive member and developing the exposed or unexposed portions of the member (depending on the type of photohardenable material used) to produce a surface relief holographic recording. Although any suitable optical system capable of producing the blazed, surface relief hologram construction disclosed herein may be employed, a preferred mode of creating the preferred interaction of the object modulated wave front and the reference beam is by allowing the object modulated beam to interfere, interact and combine with a reference beam propagating in a direction so that the vector direction of the reference beam forms an angle between about 90° and about 180° with substantially all of the directional vectors of the object beam, with object modulated beam and the reference beam, with object modulated beam and the reference beam directed at opposite sides of the photohardenable member. In this preferred mode of construction exposure, of course, both sides of a typical photohardenable layer must be permeable to exposure radiation and this is typically provided by coating a layer of photohardenable material on a transparent substrate.

BRIEF DESCRIPTION OF THE DRAWINGS

For a better understanding of the invention as well as other objects and further features thereof, reference is made to the following detailed disclosure of this invention taken in conjunction with the accompanying drawings wherein:

FIG. 1 is a partially schematic, partially side-sectional view of a visualized standing wave pattern, in and around the photohardenable layer, the wave pattern produced when the object modulated beam meets the reference beam. A surface relief produced after development is also shown.

FIGS. 2A and 2B are plan drawings of approximately 2,000X photomicrographs of the developed surface of a photohardenable member hereof wherein the object beam is a collimated beam and a diffuse object beam, respectively; and FIG. 2C, is a drawing of an approximately 15,000X photomicrograph of a side-sectional view of a developed photohardenable layer according to the invention, the dark line showing the surface contour being an evaporated reflecting layer on the developed surface to improve reflectability and reconstruction efficiency thereof;

FIG. 3 is a partially schematic representation of the reconstruction of the hologram produced in FIG. 1; and FIG. 4 is a construction geometry used in Example I.

FIG. 5 is the construction geometry used in Example I.

FIG. 6 shows construction of a blazed hologram using at least a partially transparent complex object.

FIG. 7 shows reconstruction of the image of a complex object using a blazed hologram.

DESCRIPTION OF PREFERRED EMBODIMENTS

Referring now to FIG. 1, there is shown a standing wave pattern as it might appear if visible, represented by lines 10, and a photohardenable layer 12 which may optionally be supported by any suitable support substantially transparent to the constructing radiation. Layer 12 while typically flat may be a curved surface and may be in the form of a web, cylindrical surface, endless belt, moebius strip and other shapes. Lines 10 where included within outline 14 of the photohardenable layer 12 also represent lines of preferential hardening in the volume that is layer 12 along the surfaces of maximum intensity throughout its depth. (Of course, this assumes a photohardenable material which hardens in response to activating radiation, although of course it will be understood by those skilled in the art, and as used herein, photohardenable material is also intended to encompass those materials which soften along the surfaces of maximum radiation intensity).

A preferred mode of accomplishing the standing wave interference pattern of FIG. 1 is to direct the object modulated beam to interfere, interact and combine with a reference beam propagating in a direction so that the vector direction of the reference beam forms an angle between about 90° and about 180° with substantially all of the directional vectors of the object beam, with the object modulated beam and the reference beam directed at opposite sides of the photohardenable member.

As schematically shown in FIG. 1 (and as will be further described in relation to FIG. 4), this preferred construction exposure may be accomplished by splitting a coherent beam, using one component to form the object modulated beam 18 directed at one side of layer 12 and using the other component of the beam to form the reference beam 16 directed at the opposite side of layer 12.

Another mode of accomplishing the preferred construction exposure is to direct a beam of coherent light at the photohardenable member as reference beam 16, directing the reference beam after it has passed through the photohardenable member to the object, to be reflected therefrom to form the object beam 18 which is then transmitted back to the photohardenable layer 12 to interfere with the reference beam to create the standing wave interference pattern. This mode, for example, is shown in Denisyuk, Soviet Physics 7, No. 6, 543 (1962).

Lasers are preferred sources of coherent radiation. However, it is to be understood that any source of sufficiently coherent radiation may be used. Also electromagnetic radiation of any suitable wavelength may be used such as coherent: X-ray, ultraviolet, infrared radiation, as well as particle beams such as electrons, positrons, protons, alpha particles, etc., so long as the photohardenable layer is responsive thereto to create waves in the photohardenable layer, relatively more or less hardened or resistant to developer, the waves corresponding to radiation intensity waves corresponding to the interfering standing wave pattern.

The etched surface 20 of photohardenable layer 12 results from contacting at least one surface of layer 12, after construction exposure with an object modulated object beam and a reference beam, with an etchant for the less resistant portions of layer 12 which causes preferential etching away of the photohardenable layer at its surface in the relatively less exposed areas.

Any suitable photohardenable material may be used herein, so long as its properties are matched with the hardening or softening radiation of the particular coherent light source chosen.

The cinnamate esters of polyvinyl alcohol and/or cellulose which may be further sensitized by the presence of anthrones and their derivatives, polynuclear quinone derivatives and certain ketones such as Michler's Ketone and which are commercially available under the trademarks Kodak Photoresist (KPR), Kodak Thin Film Resist (KTFR) KMER and KOR from the Eastman Kodak Co. are found to be suitable photohardenable materials for use herein. Shipley AZ1350 Photoresist from Shipley Co. Inc. is found to work well.

Other typical photohardenable materials are systems comprising a nonphotosensitive polymer and a photosensitive low-molecular weight compound with which it is capable of reacting on exposure to produce insolubility typified by polymeric materials such as casein and rubber, in combination with photosensitive azidostilbene sulfonate derivatives; systems comprising a monomer, a dimer and/or a low-molecular weight polymer with a filler and one or more polymerization catalysts typified by materials as described in U.S. Pat. Nos. 2,760,863 and 2,791,504 by Plambeck; systems comprising a nonphotosensitive polymer and photosensitive low-molecular weight compounds wherein the photosensitive agent reacts with itself on exposure to create insolubility in exposed portions typified by ethylcellulose, polymethyl methacrylate and numerous other commercial plastics containing photosensitive chalcone or unsaturated ketone derivatives typified by materials as described in Murray U.S. Pat. No. 1,965,710 and Van Deusen U.S. Pat. No. 2,544,905; systems of chromate compounds in colloids such as gelatin, albumen and glue or protein colloids sensitized for example with potassium bichromate or cellulose derivatives sensitized for example with ammonium dichromate or other polyvinyls such as polyvinylalcohol, polyvinylacetal, polyvinyl methyl ether and polyvinylpyrrolidone sensitized for example with ammonium dichromate or polyamides sensitized by dichromates; diazosensitized materials, and others.

Other photohardenable layers will occur to those skilled in the art including high resolution silver halide emulsions containing a tanning developer for example, as taught in Canadian Patent 772,105 and patents cited therein, which may be exposed to the standing wave interference patterns hereof and developed by contacting the layer with an alkaline solution that hardens the gelatin in the vicinity of the developed silver grains whereby the unhardened portions of the outer surface of the emulsion may be removed by dissolution in a good solvent.

A photohardenable layer, because of the holographic exposure, hardens along the lines of maximum intensity throughout much of its depth. When put into the developer solvent, a surface structure is produced which follows sections of the intensity surfaces because the areas of lower exposure are eroded where they come to the surface of the photoresist.

Referring now to FIGS. 2A and 2B, which are drawings of about 2,000X photomicrographs in plan view of the preferentially etched surface of developed photohardenable members hereof, FIG. 2A is a hologram of this invention where the object beam is a collimated beam, i.e. a beam of plane waves, which when interfering with an off axis reference beam, which may typically be a plane wave front, but need not be, (where the axis is the normal to the photohardenable member) creates an off axis standing wave pattern of plane waves if the reference beam is a plane wave front, to create after development the regular, substantially parallel sawtoothed, blazed pattern illustrated in FIG. 2A. The darker portions of the drawing represent the edges of the sawtooth peaks.

FIG. 2B illustrates, in plan view, a hologram hereof except that the object holographed was an irregular object, for example a person, a house, a submarine and so on and the object modulated beam was created by reflecting a portion of a laser beam off of the irregular object. The irregularity in the grooves of the hologram produced in FIG. 2B, the darker portions representing the edges of the sawtoothed peaks of the hologram, carries the object information, which as will be explained, may be reconstructed to produce a viewable image when a reconstructing reference beam is directed at the hologram produced according to the invention.

Referring now to FIG. 2C, there is shown the drawing of about a 15,000X electron micrograph of a developed photohardenable layer in cross section, the black line 22 showing the blazed, step or sawtoothlike surface contour of the etched surface with an optional and in some cases a preferred mode of operation hereof of evaporating a layer of reflective material such as aluminum onto the surface relief of the hologram. This reflecting, typically metal layer is typically 0.2 micron thick and may be formed by vacuum evaporation. Other suitable reflective materials may be used including silver, gold, chrome, and dielectric materials.

The minimum direct distance 21 of the height of the riser portion of the surface profile above the tread portion of the step pattern is found to be in the range of between about 0.05 microns and about 10 microns for the preferred constructing radiations according to the invention. The horizontal distance between risers may vary widely depending on the angle between the object modulated beam and the reference beam.

Referring now to FIG. 3, there is illustrated typical reconstruction according to this invention of an image produced from a hologram made according to the invention. This image is produced by directing a light beam 16, similar in wavelength, wave front curvature and propagation direction to the reference beam used to make the hologram, against that side of the reflecting surface layer 24 in contact with the photohardenable layer 12. Peak reconstruction efficiency is obtained by directing this reconstruction beam at the same angle as the reference beam and using the same wavelength of light in both cases and directing this light through the photohardenable material. To do otherwise is acceptable if the resultant lower efficiencies are acceptable. The main penalty for using a reconstruction beam of a different curvature is the introduction of image aberrations.

It is seen that if the photohardenable material is self-supportable, surface relief effects according to this invention may be formed on both faces of the photohardenable layer and the hologram may be split to give two separate holograms.

As indicated in FIG. 3, the light distribution among the various diffraction orders is desirably highly unsymmetrical. The brightness of the reconstructed object for the zero and ±1 orders is given in terms of percentage of reflected light for both a collimated object beam (Point Object) and an object beam modulated by an irregular object (Diffuse Object). It is expected that these percentage efficiencies will increase as recording parameters are optimized. If the reconstruction beam and layer geometry is identical to the recording geometry, which is the preferred mode of reconstruction for optimally efficient reconstruction, the efficiency of the plus one selected order is highest. For example, in the case of holograms hereof made where the object beam is a collimated beam, the resulting hologram is in fact a blazed grating, and it is observed that a highly efficient 73 percent of the reflected light of the reference beam goes into the desired first order which is very close to the 80 percent efficiency obtained from commercially available blazed gratings. This figure of 73 percent compares with about 6 percent efficiency obtainable from an absorptive type sinusoidal transmission grating such as could be produced from a photographic emulsion and with from 11 percent to about 30 percent obtainable from a sinusoidal phase grating such as the surface relief gratings produced on thermoplastic materials as described in copending application Ser. No. 521,982, filed Jan. 20, 1966. Phase gratings that operate at 30 percent efficiencies produce very poor quality images. The blazed diffraction grating holograms of this invention should in theory diffract more than 90 percent of reflected 4880 angstrom light into the +1 diffraction order because of the unique surface structure of the hologram hereof and it is expected that the 73 percent figure will move closer to the 90 percent figure as the parameters of this invention are optimized.

In fact, it is found that by utilizing a collimated object beam in the system hereof, there is provided a preferred mode of making diffraction gratings of a specified frequency which are presently commercially produced by mechanically ruling aluminum or other suitable blanks in which the surface grooves are formed by a shaped diamond stylus which is a time consuming and costly method of construction.

One reason for the vastly superior efficiencies of the holograms of this invention is the blazed steplike pattern of the holograms hereof, each blaze in effect being a very small highly reflective mirror which is inherently more reflective than, for example, the more sinusoidal type patterns of copending application 521,982 and of other prior art modes of making holograms and particularly diffraction gratings.

The following Example further specifically defines the present invention with respect to novel surface blazed holograms. The parts and percentages are by weight unless otherwise indicated. The Example below is intended to illustrate a preferred embodiment of the imaging system of this invention.

EXAMPLE I

Referring now to FIG. 4, a glass plate 26 is overcoated with an approximately 2 micron thick layer 12 of Shipley (Shipley Co. Inc.) AZ1350 Photoresist. The layer is exposed to light from an argon continuous wave laser of about 30 milliwatt optical power as follows: The laser beam is directed through diverging lens 32, collimating lens 34 and through beam splitter 36 to create two beams of radiation, a first beam reflected off of mirrors 38 and 40 to the glass plate side of member 28 and a second beam reflected from the beam splitter 36 to the layer 12 side of member 28. The second beam, a collimated beam of light, intersects the photoresist surface 12 making an angle of about 15° to the plate normal. The first beam, another collimated beam of light intersects the opposite glass surface 26 making an angle of about 40° to the plate normal. These two beams overlap in the photoresist region, giving rise to interference fringe surfaces that are about 0.16 microns apart and which make an angle of about 9° with the photoresist surface.

The photoresist is exposed continuously to these light beams until a total light energy of about 2 joules per cm$^2$ is received. Member 28 is then removed from the exposure equipment and immersed in AZ1350 Developer from Shipley Co. Inc. for a period of about 20 seconds. The plate is then immediately immersed in distilled water for about 5 seconds and the surface is dried with a burst of compressed air. The photoresist surface is next vacuum coated with a nearly opaque layer of highly reflecting aluminum.

The surface of the blazed hologram now consists of segments of the interference pattern present in the photoresist during exposure. This has the appearance of steps with a riser about 0.16 microns high and treads about 1.15 microns wide.

Referring now to FIG. 5, the hologram is reconstructed by directing the second beam at the hologram placed where member 28 was placed in construction.

FIG. 6 shows construction of a blazed hologram using at least a partially transparent complex object.

FIG. 7 shows reconstruction of the image of a complex object using a blazed hologram.

Although specific components and proportions have been stated in the above description of preferred embodiments of the blazed hologram imaging system hereof, other suitable materials, as listed herein, may be used with similar results. In addition, other materials may be added to the materials used herein and variations may be made in the various processing steps to synergize, enhance, and otherwise modify its properties.

It will be understood that various other changes in the details, materials, steps and arrangements of parts which have been herein described and illustrated in order to explain the nature of the invention, will occur to and may be made by those skilled in the art upon a reading of this disclosure and such changes are intended to be included within the principle and scope of this invention.

I claim:
1. An imaging method comprising
    directing an object modulated beam of coherent radiation at one face of a photosensitive layer of finite volume,
    directing a reference beam of coherent radiation in phase with the radiation of the object beam at the other face of said layer creating a standing wave interference pattern including a plurality of standing wave surfaces in the volume of said layer and intersecting said faces that change the resistance to removal of the layer in areas corresponding to the standing wave surfaces, and
    forming a blazed surface on at least one of said faces by removing portions of the layer having less resistance to removal with said blazed surface including segments of said plurality of standing wave surfaces that together form a standing wave surface capable of modulating radiation for reconstruction of an image of the modulating object.

2. The method of claim 1 wherein said photosensitive layer includes a photohardenable material.

3. The method of claim 2 wherein said forming step includes subjecting said photohardenable layer to a solvent for dissolving away the layer near the face in the changed areas corresponding to said standing wave surfaces.

4. The method of claim 2 wherein the resistance to removal of the photohardenable material is increased in the areas corresponding to said plurality of standing wave surfaces.

5. The method of claim 2 wherein the resistance to removal of the photohardenable material is reduced in the areas corresponding to said plurality of standing wave surfaces.

6. The method of claim 1 further including directing a reconstruction beam of coherent radiation onto said blazed surface to form an image of the modulating object.

7. The method of claim 6 wherein said reconstruction beam is directed toward said blazed surface at substantially the same direction as said reference beam.

8. The method of claim 6 wherein said reconstruction beam includes radiation of substantially the same wavelength as the radiation of said reference beam.

9. The method of claim 6 wherein said reconstruction beam is directed to a blazed surface through the photosensitive material.

10. The method of claim 6 wherein said reconstruction beam is directed onto said layer from the same side as the blazed surface.

11. The method of claim 1 further including providing a support for said photosensitive radiation that is transparent to said radiation.

12. An imaging method according to claim 1 wherein the vector direction of the reference beam is other than perpendicular to said layer and forms an angle between about 90° and about 180° with substantially all of the directional vectors of the object modulated beam.

13. The imaging method according to claim 1 wherein the object modulated beam and the reference beam are collimated beams.

14. An imaging method according to claim 13 wherein the reference beam is off axis.

15. An imaging method according to claim 1 including the additional step of depositing a thin layer of reflective material over and in conformance with said blazed surface.

16. An imaging method according to claim 15 wherein said reflective surface comprises a reflective metal which is deposited on said blazed layer surface by vacuum evaporation.

17. The method of claim 15 further including directing a reconstruction beam of coherent radiation onto said coated blazed surface to form an image of the modulating object.

18. The method of claim 17 wherein said reconstruction beam is directed onto said coated blazed surface through said photosensitive layer.

19. The method of claim 17 wherein said reconstruction beam is directed onto said coated blazed surface from the coated side.

20. An imaging method according to claim 1 including the additional step of splitting the photosensitive layer between the two faces thereof to give two separate exposed layers.

21. The process of forming at least one replica of the blazed surface product of the method of claim 1 which comprises the steps of:
 a. forming a first generation negative master of said blazed surface by forming against the blazed surface of said image at a temperature below about 200° F. a layer of a hardenable material which is inert to said surface, hardening said layer and stripping the thus formed negative master from said surface; and
 b. forming a second generation positive replica by depositing a solution of film forming material dissolved in a solvent on said first generation negative master sufficient to form a thin dried layer having a smooth deformation free outer surface, pressing the smooth surface of a support member against said deformation free outer surface and removing said first generation negative master from the thus formed second generation positive replica.

22. The process according to claim 21 including repeating step (b) of claim 21 with fresh solutions of film forming material.

23. The process according to claim 21 wherein said hardenable material is a curable silicone rubber.

24. A blazed hologram comprising
 a photosensitive layer of finite volume upon which has been directed an object modulated beam of coherent radiation at one face of said layer and a reference beam of coherent radiation in phase with the radiation of the object beam at the other face of the layer creating a standing wave interference pattern including a plurality of standing wave surfaces in the layer and intersecting said faces that changed the resistance to removal of the layer in areas corresponding to said standing wave surfaces, and
 a blazed surface on at least one face of said layer formed by removing portions of the layer having less resistance to removal, said blazed surface including segments of said plurality of standing waves that together form a standing wave surface capable of modulating radiation for reconstruction of an image of the modulating object.

25. The blazed hologram of claim 24 wherein said photosensitive layer includes a photohardenable material and said blazed surface is formed by dissolving away with a solvent the areas of the layer having less resistance to removal by dissolution in the solvent.

26. The blazed hologram of claim 24 wherein each segment of said blazed surface is a step having a riser portion and a tread portion and the distance between the top of the riser and the tread is from about 0.05 to about 10 microns.

27. The method of claim 31 wherein said object beam is modulated by an at least partially transparent complex object.

PO-1050
(5/69)

UNITED STATES PATENT OFFICE
CERTIFICATE OF CORRECTION

Patent No. 3,580,657  Dated  May 25, 1971

Inventor(s)  Nicholas K. Sheridon

It is certified that error appears in the above-identified patent and that said Letters Patent are hereby corrected as shown below:

Column 3, line 55, after "with" insert ---the---.

Claim 27, line 1, "31" should read ---1---.

Signed and sealed this 25th day of April 1972.

(SEAL)
Attest:

EDWARD M. FLETCHER, JR.
Attesting Officer

ROBERT GOTTSCHALK
Commissioner of Patents